Patented Jan. 25, 1949

2,460,225

UNITED STATES PATENT OFFICE 2,460,225

BIOTIN INTERMEDIATE

Stanton A. Harris, Westfield, and Karl Folkers, Plainfield, N. J., assignors to Merck & Co., Inc., Rahway, N. J., a corporation of New Jersey No Drawing. Application December 15, 1945, Serial No. 635,427

13 Claims. (Cl. 260—329)

This invention is concerned generally with novel chemical compounds and processes of preparing the same; more particularly it relates to novel compounds useful as intermediates in synthesis of the growth-promoting factor, biotin.

This is a continuation-in-part of co-pending application Serial No. 554,453, filed September 16, 1944.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

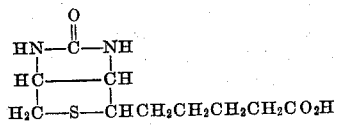

It is now found that this compound can be synthesized by reactions indicated as follows:

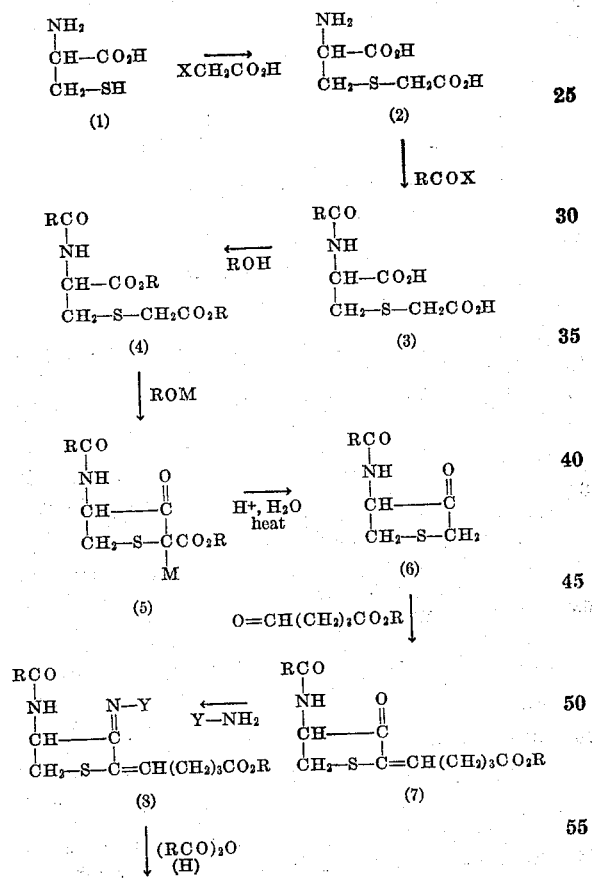

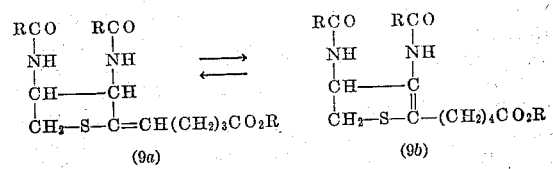

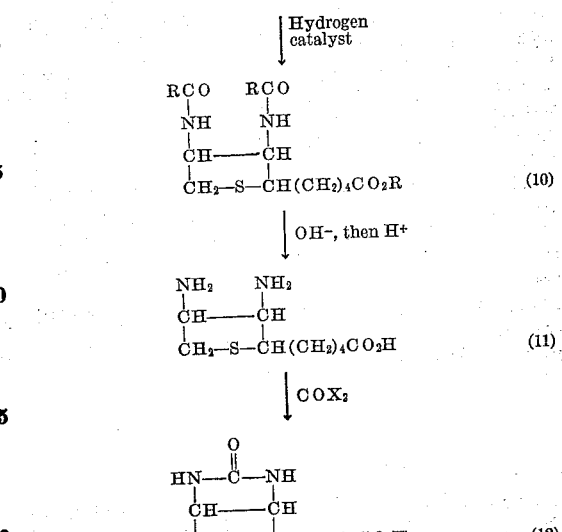

In the above formulae, R represents an alkyl, aryl or arylalkyl group; X, a halogen, M an alkali metal or an alkaline earth metal; and Y—N= is a radical selected from the group which consists of oximino, arylhydrazino and semicarbazido radicals. The reactions above indicated are conducted as follows: 2-amino-3-mercapto propanoic acid (1) and chloroethanoic acid are condensed in an alkaline aqueous solution to form 2-amino-3-carboxymethyl-mercapto-propanoic acid (2); which is then treated with an acylating agent, such as an acyl halide, in an aqueous alkaline solution to yield 3-acyl-amido-3-carboxymethylmercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 3-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxybutanal ester in a lower aliphatic alcohol reaction medium containing piperidine and a lower aliphatic carboxylic acid, produces an ester of 2-(4'-carboxy-butylidene)-3-keto-4-acylamido-tetrahydrothiophene (7). This product, when reacted with a compound selected from the group which consists of hydroxylamine, arylhydrazines and semicarbazide yields an ester of the corresponding 3-keto- substitution product of 2 - (4'-carboxy-butylidene)-3-keto-4-acylamido-tetrahydrothiophene (8) which upon treatment with a mixture of zinc, a lower aliphatic acid and a lower aliphatic acid anhydride, produces a mixture of 2-(4'-carboxy-butylidene)-3:4-di(acylamido)-tetrahydrothiophene ester (9a) and 2-(4'-carboxybutyl)-3:4-di(acylamido)-4:5-dihydrothiophene ester (9b). This mixture, or if preferred, one of the components, is then treated with hydrogen in the presence of a hydrogenation catalyst to yield stereoisomers of 2-(4'-carboxy-butyl)-3:4-di-(acylamido)-tetrahydrothiophene ester (10). When this last mentioned compound is treated with an aqueous alkaline solution, hydrolysis of the acyl groups occurs, yielding upon acidification, 2-(4'-carboxybutyl) - 3:4-diamino-tetrahydrothiophene (11) which when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

This invention is concerned generally with the class of compounds of which intermediate (8) above is a member, namely compounds of the class which consists of oximes, arylhydrozones and semicarbazones of 2-(omega-carboxy-alkylidene)-3-keto-4-acylamido - tetrahydrothiophenes and esters thereof, represented by the general formula:

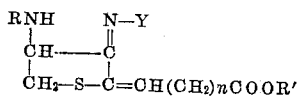

wherein R is an acyl group, R' is selected from the class consisting of hydrogen, alkyl, aryl and arylalkyl, $n$ is a small integer and Y—N= is a radical selected from the group which consists of oximino, arylhydrazino and semicarbazido radicals. More specifically, the invention is concerned with compounds of the above formula wherein $n$ is 3, the oximes, arylhydrazones and semicarbazones of 2-(4'-carboxy-butylidene)-3-keto-4-acylamido-tetrahydrothiophene esters.

According to the present invention, compounds of the above general formula are prepared by reacting a compound of the class which consists of hydroxylamine, arylhydrazines, such as p-nitrophenylhydrazine, 2:4-dinitrophenylhydrazine, and the like, semicarbazide, and salts thereof, with an ester of 2-(omega-carboxy-alkylidine)-3-keto-4 - acylamido-tetrahydrothiophene. Corresponding acids are obtained by hydrolysis of the esters thus produced. The compounds used as starting materials are obtained by the process outlined above and described in detail in co-pending applications, Serial Nos. 554,458; 554,449 now Patent 2,437,719; 554,450; 554,451; 554,452 all filed Sept. 16, 1944. When a compound of the class which consists of hydroxylamine, arylhydrazines and semicarbazide or a salt thereof, is reacted with an ester of 2- (4'-carboxy-butylidene)-3 - keto-4 - acylamido-tetrahydrothiophene, the product obtained is the corresponding 3-keto-substitution product of the corresponding ester of said 2-(4'-carboxy-butylidene) - 3 - keto - 4-acylamido-tetrahydrothiophene, an intermediate useful in the synthesis of biotin as described in copending applications, Serial Nos. 554,456 and 554,457, both filed September 16, 1944.

The following examples illustrate methods of carrying out the present invention, but it is to be understood that these examples are given by way of illustration and not of limitation.

*Example 1*

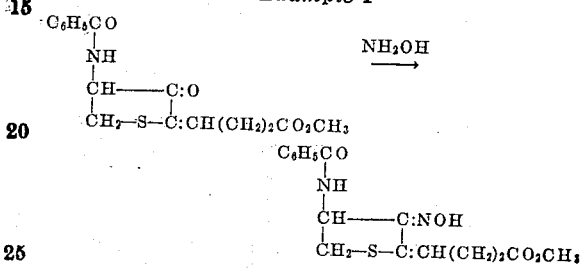

About 2.3 g. of 2-(4'-carbomethoxy-propylidene)-3-keto-4-benzamido -tetrahydrothiophene are added to a solution of approximately 0.75 g. of hydroxylamine hydrochloride in 15 cc. of pyridine, and, after standing about 16 hours at room temperature, the mixture is diluted with about 4 volumes of water and extracted with chloroform. The chloroform extract is cooled, washed at below 10° C. with hydrochloric acid (1 N), then with water, and dried. Upon evaporation of the chloroform the product, 2-(4'-carbomethoxy-propylidene)-3-isonitroso-4- benzamido-tetrahydrothiophene is obtained as an oil which is purified by recrystallization from methanol and ether to obtain the pure product (M. P. 166–167° C).

*Example 2*

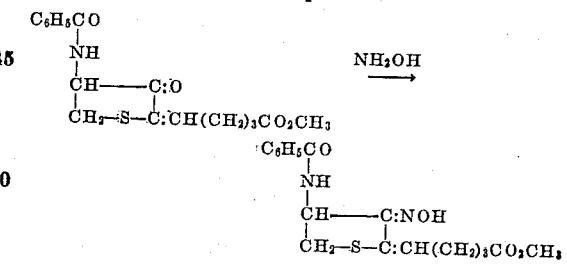

About 13.32 g. of 2-(4'-carbomethoxy-butylidene) - 3 - keto-4-benzamido - tetrahydrothiophene and about 2.80 g. of hydroxylamine hydrochloride are dissolved in alcohol and mixed with about 50 cc. of dry pyridine. The mixture is allowed to stand 15 hours at 30° C., then it is diluted with four volumes of water and extracted with chloroform. The chloroform extract is cooled, shaken with hydrochloric acid (2.5 N), washed by shaking with water, dried and concentrated at 40° C. Upon evaporation of the solvent a mass is obtained which is extracted with ether to remove impurities, and dried. The crude 2-(4'-carbomethoxy-butylidene)-3-isonitroso-4-benzylamido-tetrahydrothiophene thus obtained (M. P. 129–138° C.) is purified by repeated recrystallization from methanol, yielding the pure oxime (M. P. 159–160° C.). When the pure oxime is treated with alcoholic sodium hydroxide, then with aqueous acid, 2-(4'-carboxybutylidene)-3-isonitroso-4 - benzamido-tetrahydrothiophene (M. P. 203–204° C.) is obtained.

Example 3

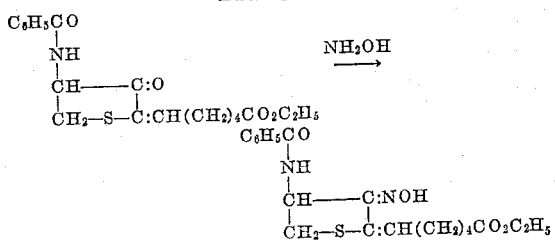

About 10 g. of 2-(5'-carboethoxy-pentylidene)-3-keto-4-benzamido - tetrahydrothiophene are added to a solution of approximately 3.9 g. of hydroxylamine hydrochloride in about 50 cc. of pyridine and the solution, after standing about 16 hours at room temperature, is diluted, extracted with chloroform and otherwise processed as described in the preceding examples. The product obtained is 2-(5'-carboethoxy-pentylidene)-3-isonitroso-4-benzamido -tetrahydrothiophene (M. P. 140–142° C.).

Example 4

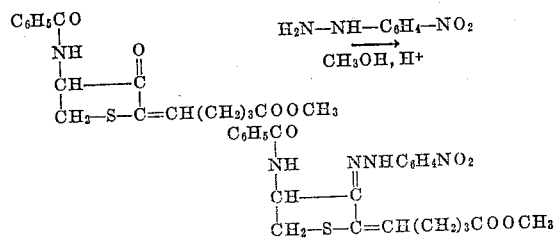

About 1.1 gms. of 2-(4'-carbomethoxy-butylidene)-3-keto-4-benzamido-tetrahydrothiophene and about 0.5 g. of p-nitro-phenylhydrazine are added to approximately 10 cc. methanol containing 2 drops of concentrated hydrochloric acid and the mixture refluxed until the p-nitrophenylhydrazine is completely dissolved. Upon cooling, the product crystallizes and is recrystallized from methanol to produce pure 2-(4'-carbomethoxy-butylidene)-3-(p-nitrophenylhydrazino)-4-benzamido-tetrahydrothiophene; M. P. 154–156° C.

Example 5

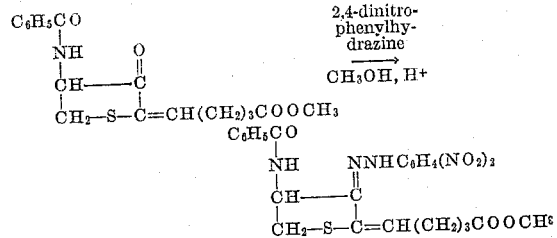

About 1 gm. of 2-(4'-carbomethoxy-butylidene)-3-keto-4-benzamido-tetrahydrothiophene and about 0.5 g. of 2:4-dinitrophenylhydrazine are added to approximately 10 cc. methanol containing 2 drops of concentrated hydrochloric acid and the mixture refluxed until the 2:4-dinitrophenylhydrazine is completely dissolved. Upon cooling, the product crystallizes and is recrystallized from methanol to produce pure 2-(4'-carbomethoxy - butylidene) - 3 - (2:4 - dinitrophenylhydrazino)-4-benzamido - tetrahydrothiophene; M. P. 181–185° C.

It will be understood by persons versed in this field of invention that the above-described reactions can be conducted using as a starting material a compound within the general class of the 2 - (omega - carboxy - alkylidene) -3-keto-4-acylamido-tetrahydrothiophene esters but having an acylamido group different from benzamido, for example acetamido starting materials yield corresponding acetamido products, propamido starting materials yield propamido products, etc. The ester group, not being involved in or affected by the reaction, can be any alkyl, aryl or arylalkyl ester and a corresponding product is obtained, viz., propyl ester starting material yields propyl ester product, benzyl ester starting material yields benzyl ester product, etc.

Modifications may be made in carrying out the present invention without departing from the spirit and scope thereof and the invention is to be limited only by the appended claims.

We claim:
1. A compound selected from the group which consists of oximes, arylhydrazones and semicarbazones of 2-(omega-carboxy-alkylidene)-3-keto - 4 - acylamido - tetrahydrothiophene, and alkyl, aryl, and arylalkyl esters thereof.
2. 2-(4'-carbomethoxy - butylidene) -3-p-nitrophenylhydrazino)-4-benzamido - tetrahydrothiophene.
3. 2-(4-carbomethoxy - butylidene)-3-(2:4-dinitrophenylhydrazino)-4-benzamido-tetrahydrothiophene.
4. 2-(omega-carboxy-alkylidene)-3-isonitroso-4-acylamido-tetrahydrothiophene.
5. 2-(4'-carboxy-butylidene) - 3 - isonitroso-4-benzamido-tetrahydrothiophene.
6. The process which comprises reacting a substance selected from the class consisting of hydroxylamine, arylhydrazines, and semicarbazides, and salts thereof, with a compound selected from the class which consists of alkyl, aryl and arylalkyl esters of 2-(omega-carboxy-alkylidene)-3-keto-4-acylamido - tetrahydrothiophene to produce the corresponding 3-nitrogen substitution product of said ketone.
7. Alkyl esters of 2-(4'-carboxy-butylidene)-3-arylhydrazino-4-acylamido-tetrahydrothiophene.
8. The stereoisomer of 2-(4'-carboxy-butylidene)-3-isonitroso-4-benzamido-tetrahydrothiophene having, when in substantially pure form, a melting point of 204° C.
9. The process which comprises reacting an arylhydrazine with an alkyl ester of 2-(4'-carboxy-butylidene)-3-keto-4-acylamido - tetrahydrothiophene to produce the corresponding 3-arylhydrazino compound.
10. The process which comprises reacting hydroxylamine with an aryl ester of 2-(4'-carboxy-butylidene)-3-keto-4-acylamido - tetrahydrothiophene to produce the corresponding 3-isonitroso compound.
11. The process which comprises reacting hydroxylamine with an arylalkyl ester of 2-(4'-carboxy-butylidene)-3-keto-4-acylamido - tetrahydrothiophene to produce the corresponding 3-isonitroso compound.
12. The process which comprises reacting p-nitrophenylhydrazine with 2-(4'-carbomethoxy-butylidene)-3-keto-4-benzamido-tetrahydrothiophene to produce the corresponding 3-(p-nitrophenylhydrazino)-compound.
13. The process which comprises reacting 2,4-dinitro-phenylhydrazine with 2-(4'-carbomethoxy-butylidene)-3-keto - 4 - benzamido-tetrahydrothiophene to produce the corresponding 3-(2,4-dinitro-phenylhydrazino)-compound.

STANTON A. HARRIS.
KARL FOLKERS.

REFERENCES CITED

The following references are of record in the file of this patent:

Karrer: Helv. Chim. Acta., 27, 132, 133, 144 (1944).